US009038687B2

(12) United States Patent
Sibona et al.

(10) Patent No.: US 9,038,687 B2
(45) Date of Patent: May 26, 2015

(54) CONSTRAINT SYSTEM OF SECTORS OF A DEVICE FOR PRODUCING AN AIRPLANE FUSELAGE

(71) Applicant: ALENIA AERMACCHI S.p.A., Venegono Superiore (IT)

(72) Inventors: Guido Sibona, Rosta (IT); Ettore Mostarda, Corsano (IT); Giuseppe Iovine, Naples (IT)

(73) Assignee: Alenia Aermacchi, S.p.A., Venegono Superiore (IT)

( * ) Notice: Subject to any disclaimer, the term of this patent is extended or adjusted under 35 U.S.C. 154(b) by 287 days.

(21) Appl. No.: 13/852,031

(22) Filed: Mar. 28, 2013

(65) Prior Publication Data
US 2013/0299095 A1 Nov. 14, 2013

(30) Foreign Application Priority Data

Mar. 30, 2012 (IT) .............................. TO2012A0286

(51) Int. Cl.
*B64C 1/00* (2006.01)
*B32B 37/00* (2006.01)
*B29C 53/82* (2006.01)
*B29C 33/48* (2006.01)

(52) U.S. Cl.
CPC ........... *B32B 37/0046* (2013.01); *Y10T 156/14* (2015.01); *B64C 2001/0054* (2013.01); *B64C 2001/0072* (2013.01); *B29C 53/824* (2013.01); *B29C 33/485* (2013.01); *Y02T 50/433* (2013.01)

(58) Field of Classification Search
CPC .............. B64C 2001/0054; B64C 2001/0072; B29C 53/824; B29C 33/485
See application file for complete search history.

(56) References Cited

U.S. PATENT DOCUMENTS

| 1,835,986 | A | 12/1931 | Heston |
| 7,597,772 | B2 * | 10/2009 | Martinez Cerezo et al. . 156/169 |
| 8,511,359 | B2 * | 8/2013 | Perlman ........................ 156/415 |
| 8,876,514 | B2 * | 11/2014 | Sana et al. .................... 156/349 |
| 2006/0145049 | A1 * | 7/2006 | Blankinship ................. 249/66.1 |
| 2013/0117983 | A1 * | 5/2013 | Sana et al. .................... 29/407.1 |

FOREIGN PATENT DOCUMENTS

| EP | 2357 058 | | 8/2011 |
| EP | 2572852 | A1 * | 3/2013 |
| FR | 2595068 | A * | 2/1986 |
| WO | WO 2007 148301 | | 12/2007 |

* cited by examiner

*Primary Examiner* — Jeff Aftergut
(74) *Attorney, Agent, or Firm* — Gottlieb, Rackman & Reisman, P.C.

(57) ABSTRACT

A constraint system of sectors of a device for producing an airplane fuselage in which a lamination mandrel is adapted to receive and support a band of impregnated synthetic material. The lamination mandrel comprises a plurality of sectors angularly spaced about the axis and mobile between: an expanded lamination position and a contracted disassembling position. A constraint system is provided between each sector and the sectors adjacent thereto which guarantees a predetermined arrangement of the first sector with respect to the second sector adjacent thereto, preventing any translation along two directions which lie in an adjustment plane perpendicular to an axis RD which extends radially from the symmetry axis to the external surface.

4 Claims, 6 Drawing Sheets

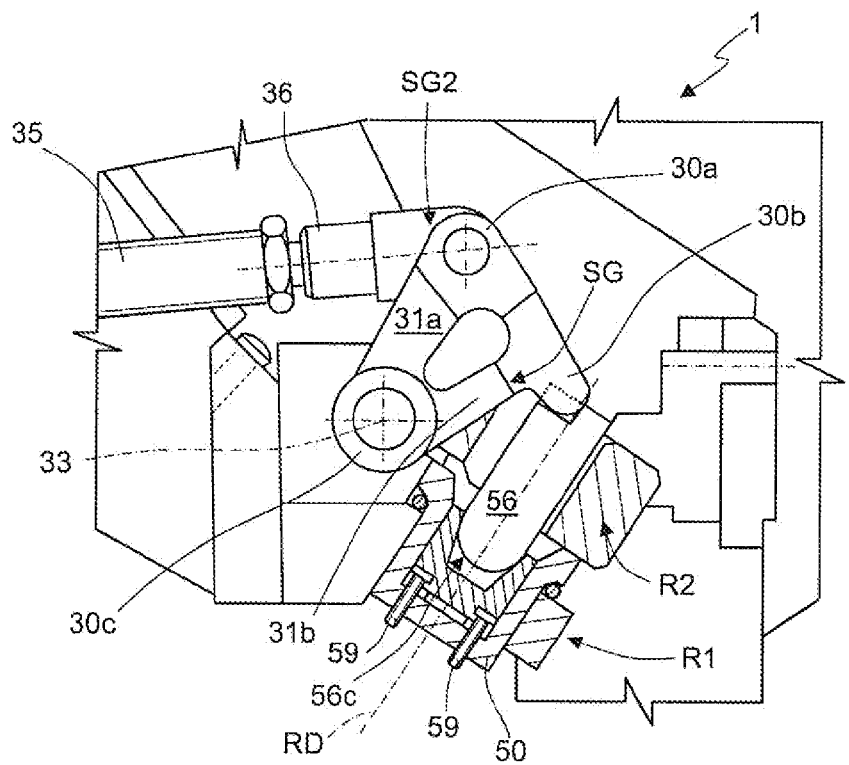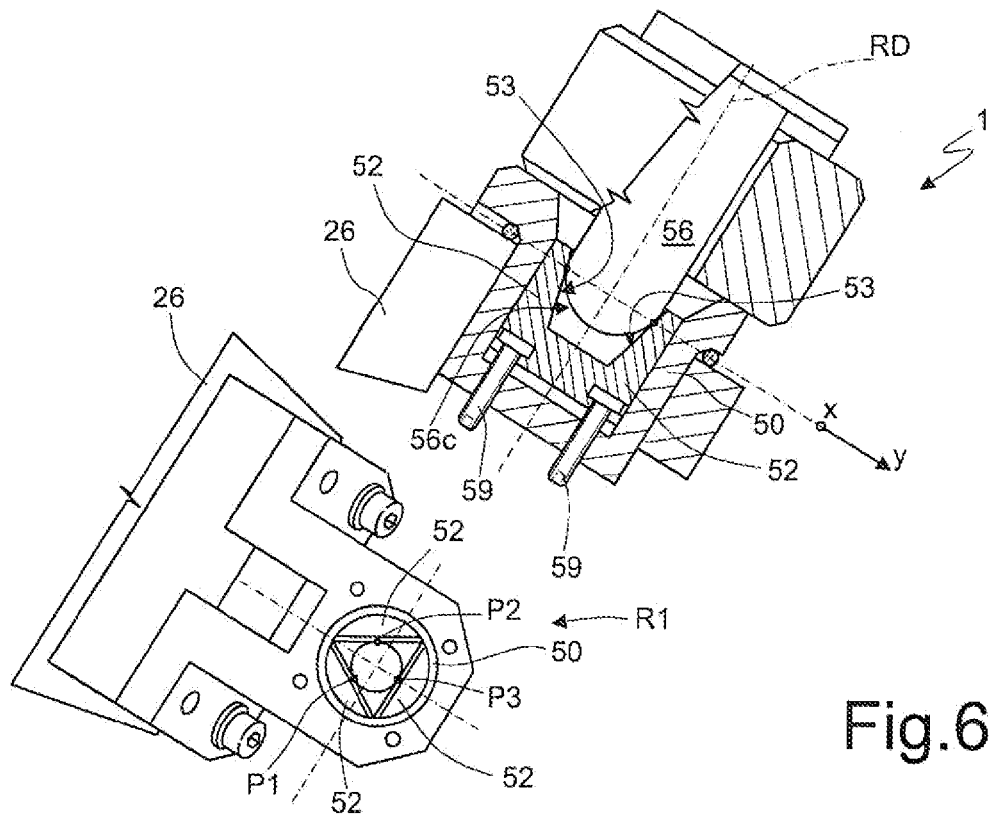
Fig.6

CONSTRAINT SYSTEM OF SECTORS OF A DEVICE FOR PRODUCING AN AIRPLANE FUSELAGE

The present invention concerns a constraint system of sectors of a device for producing an airplane fuselage.

BACKGROUND OF THE INVENTION

The patent application PCT WO 2007/148301 describes a device for producing an airplane fuselage in which a lamination mandrel is delimited by an external surface which defines a rotation solid (in particular a cylinder) with respect to a symmetry axis. The lamination mandrel is adapted to receive and support a band of impregnated synthetic material which is wound and deposited on the external surface of the mandrel in a lamination step forming a plurality of overlapped layers. Said overlapped layers are subjected to a subsequent polymerisation process under vacuum in an autoclave for forming a structural section of the airplane (typically a tubular portion of fuselage).

The lamination mandrel comprises a plurality of sectors angularly spaced about the axis and mobile between: an expanded lamination position in which the sectors have greater rectilinear edges parallel to the axis arranged side by side and the external surfaces of the sectors opposite the axis define the external surface; and a contracted disassembling position in which the sectors approach the axis moving away from the trace of the surface to reduce the axial dimensions of the mandrel allowing extraction of the lamination mandrel from the structural section of the airplane at the end of the polymerisation process under vacuum.

In the expanded lamination position it is essential for the sectors to maintain an angularly stable position with respect to one another since any slight movements between the parts can irreparably alter the geometry of the structural section.

For example the patent applicant has pointed out that a lamination mandrel used for producing structural sections of large passenger airplanes must have low dimensional tolerances, below—for example—0.5 mm.

The need is therefore felt to produce a constraint system of sectors which allows the indexing of two sectors preventing any relative movement between the sectors during the above-mentioned lamination step (in said step the mandrel can be rotated) and during the subsequent movement and maintenance of the lamination mandrel in the autoclave.

SUMMARY OF THE INVENTION

The preceding object is achieved by the present invention which relates to a constraint system of sectors of a device for producing an airplane fuselage in which a lamination mandrel is delimited by an external surface which defines a rotation solid with respect to a symmetry axis; said lamination mandrel is adapted to receive and support a band of impregnated synthetic material which is deposited and wound on the external surface forming a plurality of overlapping layers which are subjected to a polymerisation process under vacuum for forming a structural section of the airplane; the lamination mandrel comprises a plurality of sectors angularly spaced about the axis and mobile between:—an expanded lamination position in which the sectors have greater rectilinear edges parallel to the axis arranged side by side and the external surfaces of the sectors opposite the axis define together said external surface; and—a contracted disassembling position in which at least part of said sectors approaches the axis moving away from the trace of the surface to reduce the radial dimensions of the mandrel and allow extraction of the mandrel from the structural section of the airplane; the side by side adjacent edges of different sectors are adapted to be arranged one on the other in a peripheral overlapping region, characterised in that a constraint system is provided between each sector and the sectors adjacent thereto, which comprises a first catch body borne by a first sector and a second catch body borne by a second sector adjacent to the first; the first and the second catch body being configured so that, when coupled to one another, a predetermined spatial arrangement of the first sector with respect to the second sector adjacent thereto is obtained, preventing any translation along two directions (x-y) which lie in an adjustment plane perpendicular to an axis RD extending radially from said symmetry axis to the external surface.

BRIEF DESCRIPTION OF THE DRAWINGS

The invention will now be illustrated with reference to the accompanying figures which show a preferred embodiment example thereof in which:

FIG. 6 illustrates details of the constraint system.

In FIGS. 4, 5 and 6 a blocking system of sectors of a device 2 (FIG. 1) for producing an airplane fuselage is indicated overall by 1.

DETAILED DESCRIPTION OF THE INVENTION

Figure 1:
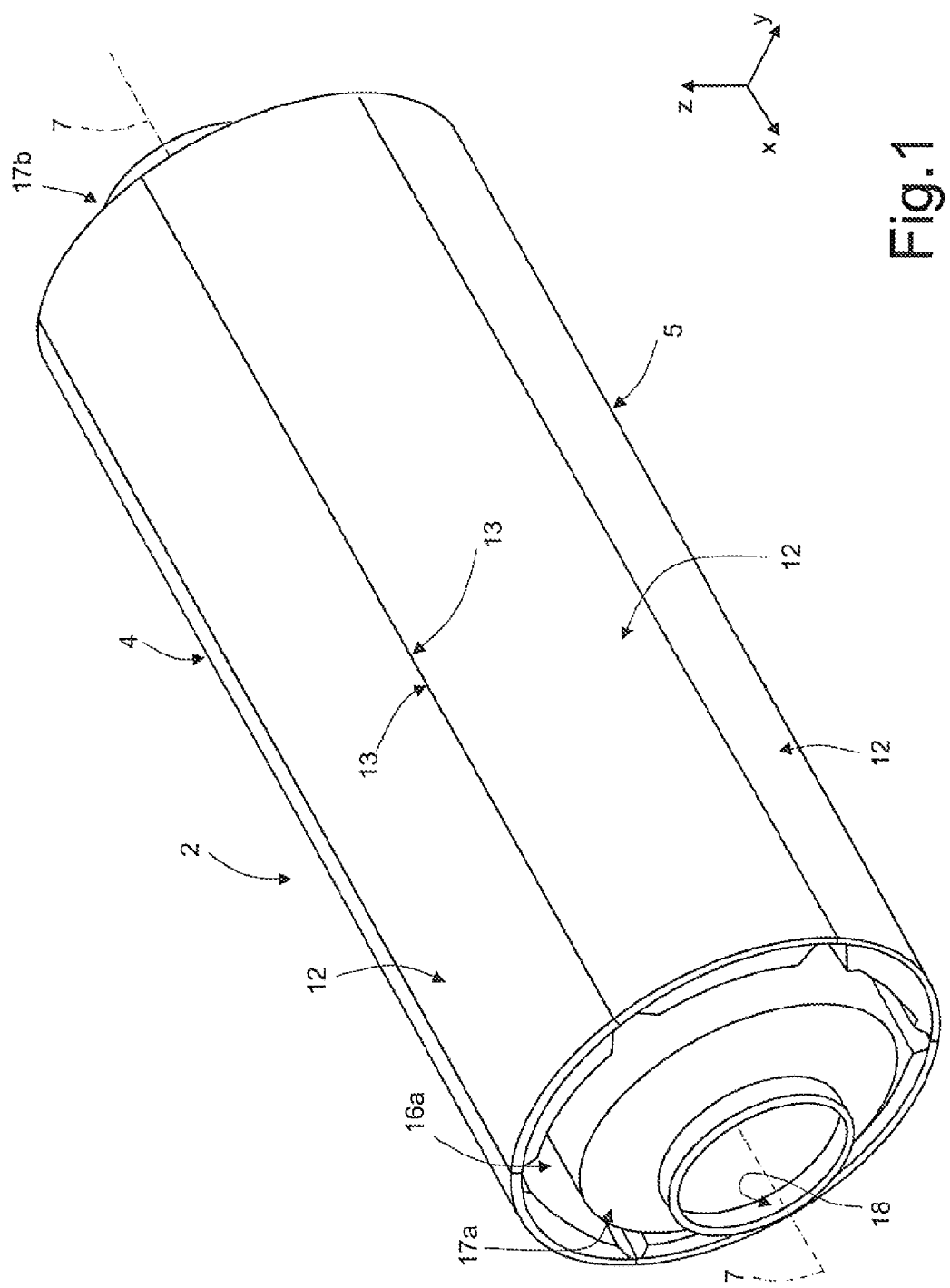
FIG. 1 illustrates—in a perspective view—a device for producing an airplane fuselage which uses a constraint system according to the invention.

In particular the device 2 (FIG. 1) comprises a lamination mandrel 4 delimited by an external surface 5 which defines a rotation solid with respect to a symmetry axis 7. The lamination mandrel 4 is adapted to receive and support a band of impregnated synthetic material which is deposited and wound on the external surface 5 forming a plurality of overlapping layers which completely and uniformly cover the surface 5. The band of synthetic material (for example carbon fibre) is deposited by a lamination head (of known type—not illustrated) on the lamination mandrel 4.

For example, the band can be deposited by causing rotation of the mandrel 4 about the axis 7 and translation in a coordinated manner of the lamination head (not illustrated) along the axis 7. For example, the patent application US2005/0039843 illustrates a lamination head. At the end of lamination of the band, the band of impregnated composite material is subjected to a polymerisation process under vacuum for forming a tubular structural section of the airplane. Said process is carried out by placing the lamination mandrel 4 in an autoclave (not illustrated) and performing a thermal cycle of known type.

In the example shown, the external surface 5 is cylindrical and the lamination mandrel 4 is used to form a cylindrical tubular portion of the airplane fuselage.

Figure 2:
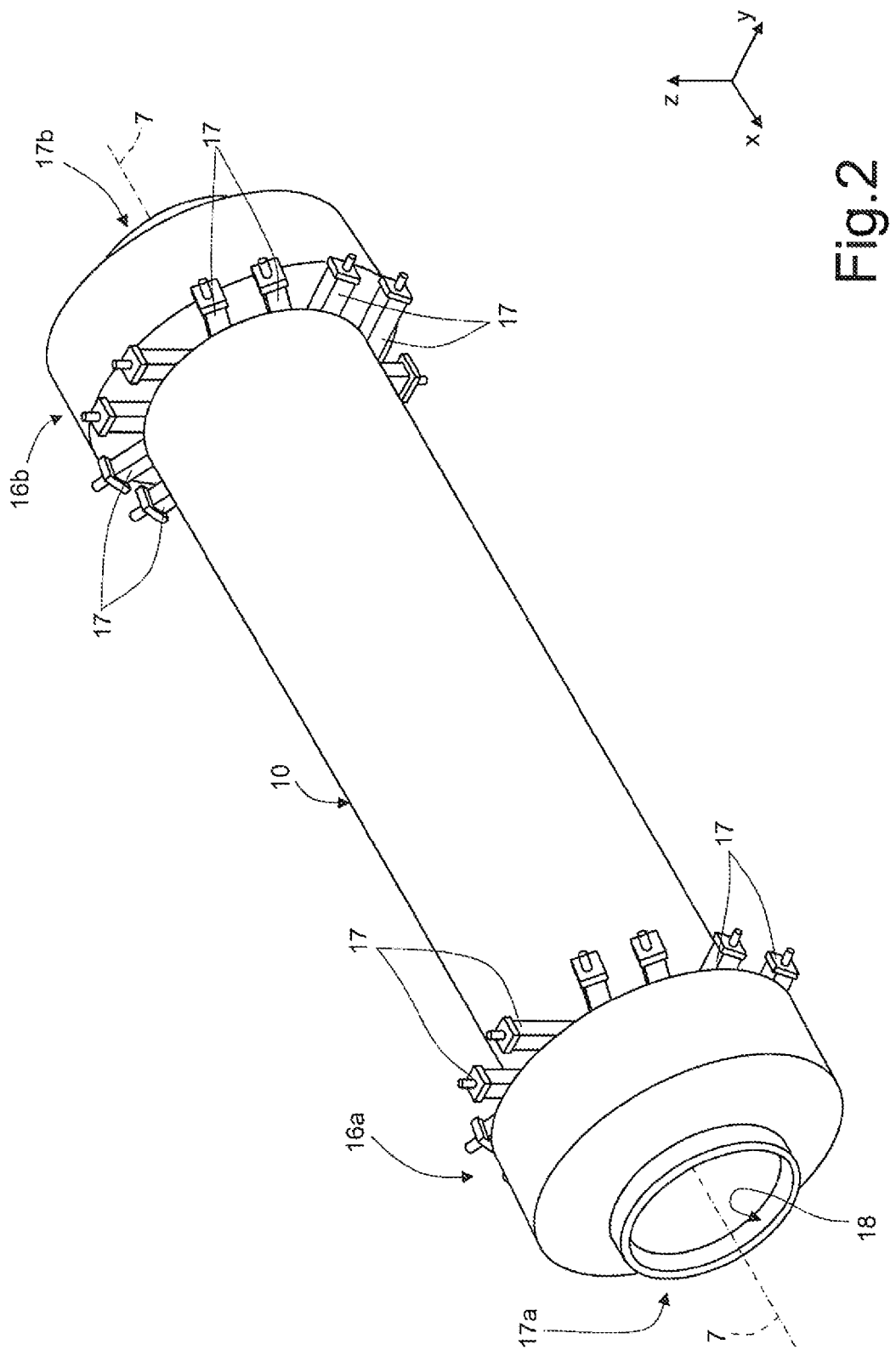
FIG. 2 illustrates—in a perspective view—an internal supporting portion of the device of FIG. 1.

The lamination mandrel 4 comprises a plurality of sectors 12 (six in the example illustrated but the number can obviously vary) angularly spaced about the axis 7 and borne by a supporting structure 10 shown schematically in FIG. 2 which extends linearly along the axis 7.

The sectors 12 are mobile between:
an expanded lamination position (FIGS. 1 and 4) in which the sectors 12 have greater rectilinear edges 13 parallel to the axis 7 arranged side by side and the external surfaces of the sectors 12 opposite the axis 7 are continuous and define—as a whole—the surface 5; and
a contracted disassembling position (FIG. 5) in which the sectors 12 approach the axis 7 moving away from the trace of the surface 5 to reduce the radial dimensions of the mandrel and allow extraction of the mandrel 4 from the structural section of the airplane at the end of the process.

In further detail (FIG. 2), the supporting structure 10 extends between a first and a second annular end structure 16a, 16b.

The supporting structure 10 ensures a high rigidity along the axis 7 (said structure will not be further described as it is produced by means of techniques of known type).

Each annular structure 16a, 16b is provided with a frustoconical steel end portion 17a, 17b which extends in an axial direction and delimits an opening 18 coaxial with the axis 7.

The patent application WO 2007/148301 provides an example of embodiment and use of a grid structure of the type mentioned above and end portions 16a, 16b.

Figure 3:
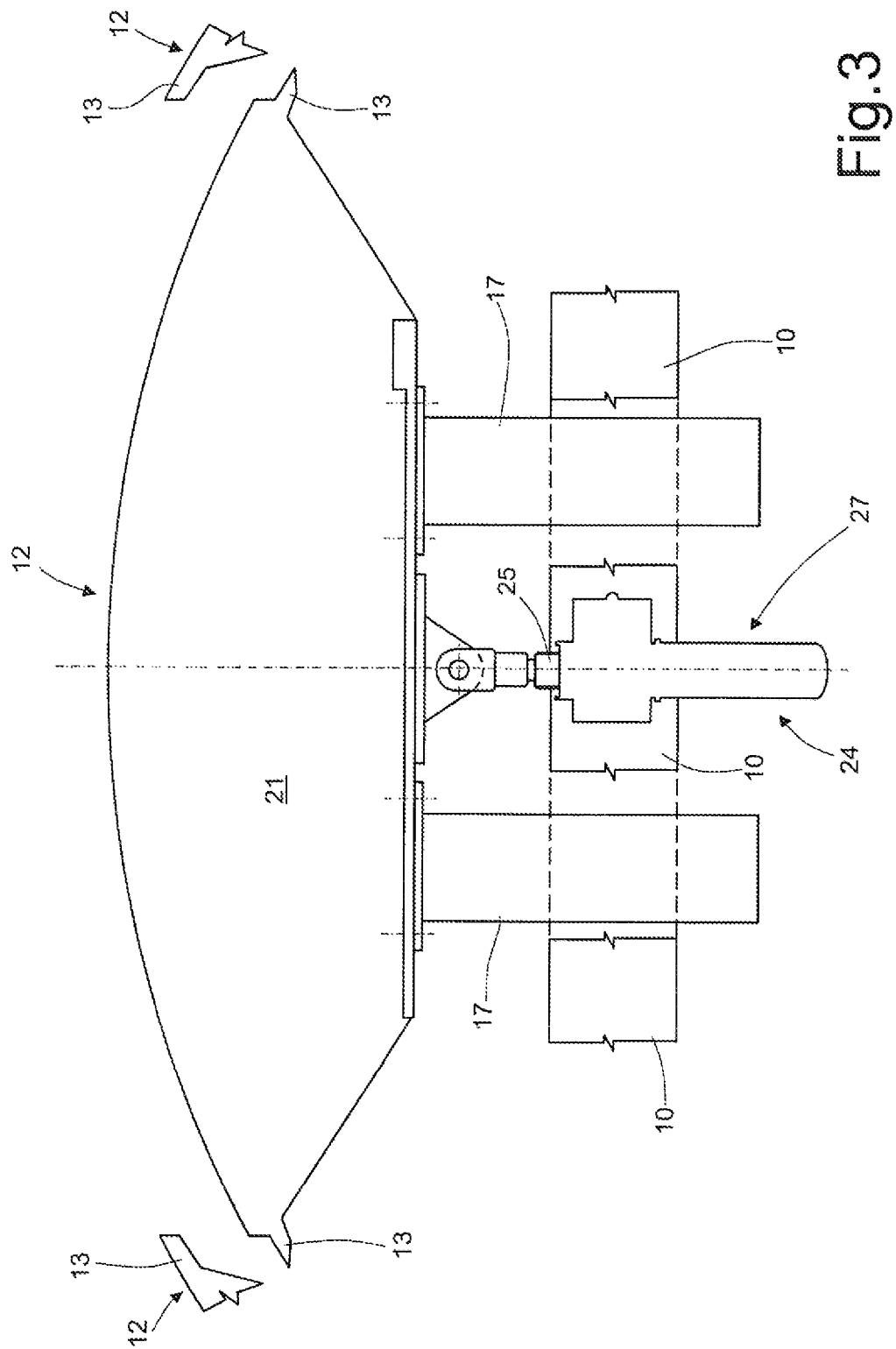
FIG. 3 illustrates, in cross section and on an enlarged scale, a portion of the device of FIG. 1.

Each sector 12 comprises a curved metallic wall 20 (refer—for example—to FIG. 3) which in cross section has the profile of an arc of a circle with centre in the axis 7 and aperture of 60° (in the example) and a stiffening structure 21 facing towards the inside of the mandrel 4 and adapted to prevent deflections/deformations of the wall 20 ensuring that the surface 5 is maintained perfectly cylindrical and coaxial with the axis 7. The stiffening structure 21 can comprise a plurality of ribs spaced along the axis 7 and having an isosceles trapezoid profile with curved longer base.

Figure 4:
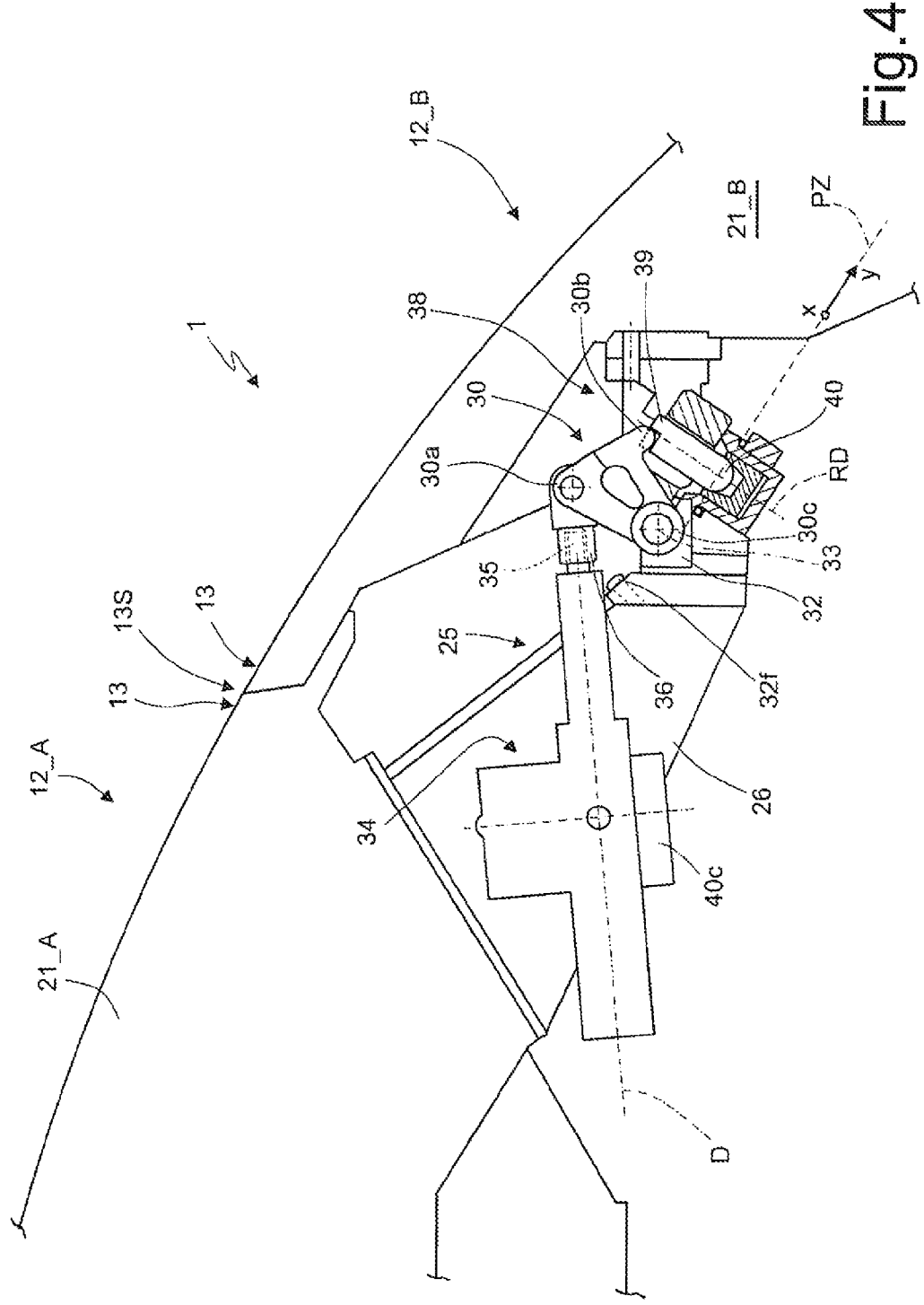
FIG. 4 illustrates, in lateral view and on an enlarged scale, the constraint system according to the invention arranged in a first closed operating position.
Figure 5:
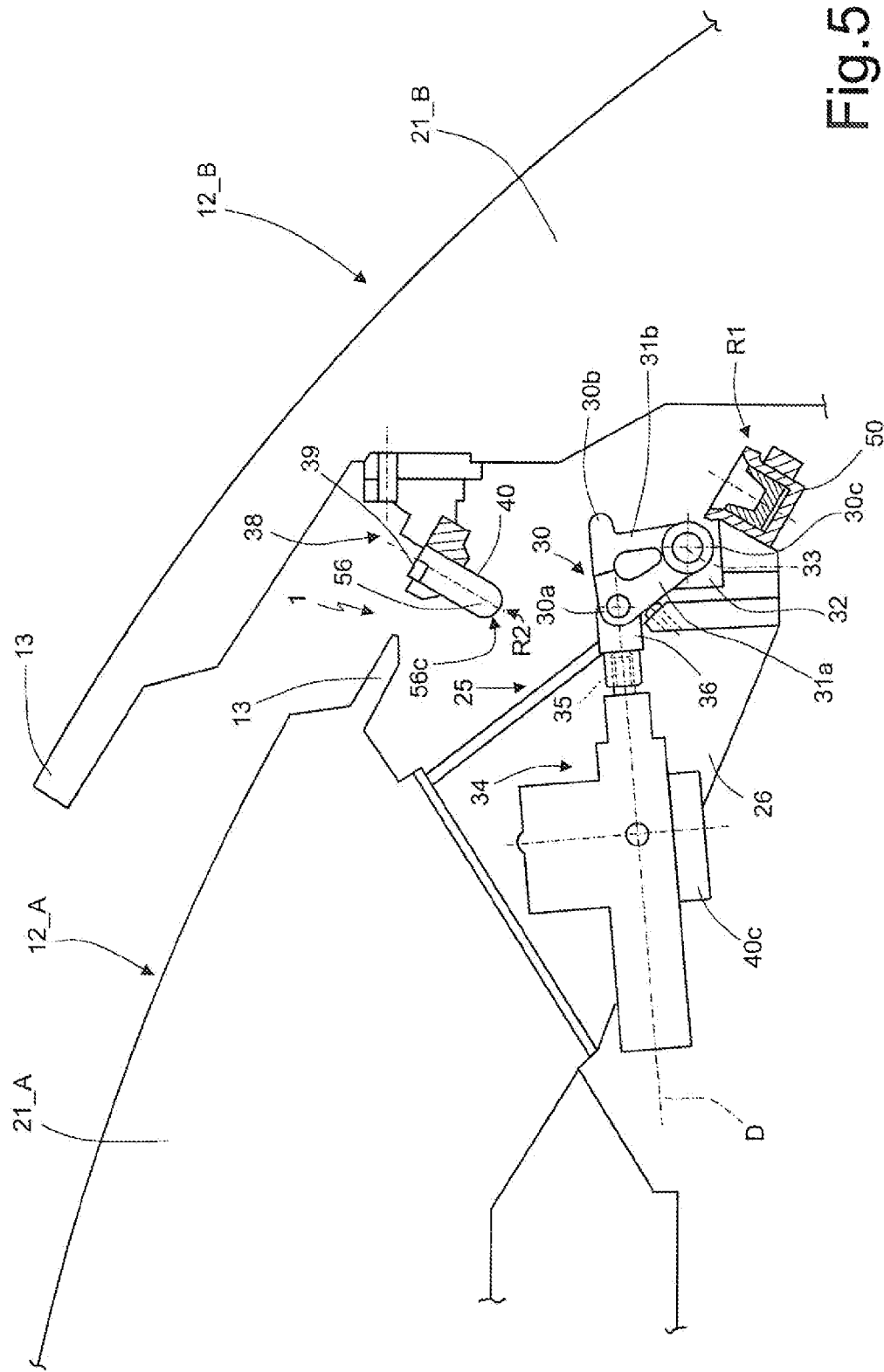
FIG. 5 illustrates, in lateral view and on an enlarged scale, the constraint system according to the invention arranged in a second open operating position.

The adjacent edges 13 of two sectors 12 are adapted to be arranged one on the other in a peripheral overlapping region 13s (FIG. 4).

Each sector 12 is provided, at one end, with a pair of rectilinear guides 17 which are positioned between the supporting structure 10 and the stiffening structure 21. The guides 17 (of known type and therefore not illustrated) extend in a radial direction, support the sector 12 and allow the reversible movement of each sector 12 between the expanded lamination position and the contracted disassembling position. Each pair of guides 17 is provided with an actuator 24 (FIG. 3) provided with a member 25 that moves in a direction parallel to that of extension of the guides; the movement of the mobile member 25 which moves away from the axis 7 shifts the sector 12 from the contracted disassembling position to the expanded lamination position while the movement of the mobile member 25 which approaches the axis 7 moves the sector 12 from the expanded lamination position to the contracted disassembling position.

Preferably a constraint device 25 is provided between each sector 12 and the sectors adjacent to it. The constraint device 25 can be activated when the sectors 12 are arranged in the expanded lamination position and is adapted to maintain in contact the side by side edges 13 of two adjacent sectors 12 applying a controlled force between the edges in the overlapping region 13s (FIG. 4).

The constraint device 25 comprises two parts adapted to couple:
a first mobile part (detailed below) arranged on an appendix 26 which extends from the stiffening structure 21-A of a sector 12-A towards the stiffening structure 21-B of a sector 12-B adjacent to the sector 12-A; and
a second fixed part (detailed below) adapted to couple with the first part and borne by the stiffening structure 21-B sector 12-B.

In this way both the above-mentioned parts are contained within the mandrel 4.

In greater detail, the component parts of the constraint device 25 are:
a lever body 30 which has a central portion 30c hinged to a parallelepipedal metal block 32 which extends from the appendix 26 towards the stiffening structure 21-B—the lever body 30 is free to rotate around a hinge axis 33 parallel to the symmetry axis 7;
an actuator 34 borne by the appendix 26 and provided with a linear outlet member 35 having an end portion 36 hinged to a first end portion 30a of the lever body 30 and mobile linearly in opposite directions along a direction D perpendicular to the hinge axis 33 to obtain rotation of the lever body 30 about the hinge axis 33;
a catch assembly 38 which extends from the stiffening structure 21—towards the appendix 26.

The lever body 30 has a second tapered end portion 30b (hooking tooth) arranged on the opposite side with respect to the first portion 30a with respect to the hinge axis 33. The lever body 30 has a roughly U-shaped form and comprises two arms 30a, 30b which develop from the central portion 30c and terminate respectively in the first end portion 30a and in the second end portion 30b which have sides facing each other.

The rotation of the lever body 30 in a first direction of rotation (for example clockwise) sets the hooking tooth 30b from a rest position (FIG. 5) in which it is spaced from the catch assembly 38 to an actuation position (FIG. 4) in which the hooking tooth 30b penetrates inside a seat 39 which opens towards the outside in a body 40 of the catch assembly 38.

In this way the hooking tooth 30b couples with the body 40 which in turn is integral with the stiffening structure 21-B.

The hooking tooth 30b is formed from a flat metallic wall which has in lateral view a substantially C-shaped profile; said C-shaped metal wall abuts with the internal walls of the seat 39 applying a force with a radial directrix directed towards the inside of the mandrel 4 so as to ensure compression between the edges 13 in the overlapping areas 13s. In this way—after the actuators 24 have arranged the sectors 12 in the extended lamination position—the outlet member 35 is extended so that the lever body 30 rotates in a clockwise direction and the hooking tooth 30b couples with the catch assembly 38 establishing a strong constraint between the two adjacent sectors 12-A, 12-B.

The process of depositing the band and subsequent movement of the lamination mandrel into the autoclave can be performed safely since all angular translation between the adjacent sectors is prevented. In this way non-modifiability of the external surface 5 is guaranteed.

At the end of the band hardening process, retraction of the outlet member 35 is commanded to produce anti-clockwise rotation of the lever body 30 so that the second portion 30b can be arranged in the rest position. In said position the sectors can be retracted towards the axis 7, i.e. the sectors can be set from the expanded operating position (the position they were in previously) to the disassembling position.

Again according to the present invention, the actuator 34 (FIGS. 4 and 5) is coupled with a load meter-controller 40-C adapted to measure and adjust (by means of known technologies) the load applied by the tooth 30b to the catch element 38 and therefore the closing force of a sector 12-B on the other sector 12-B adjacent thereto.

The load can be measured directly, measuring by means of devices of known type the deformations sustained by the arm 31b of the lever body 30 during the closing operations in which the arm 31b sets to the actuation position in which the end portion 30b penetrates by pressing into the seat 39.

Typically on said arm 31b an extensometer SG can be arranged formed—by means of known technologies—of a plurality of coils of a conductor, the resistance of which varies according to the deformation of the arm (and therefore the load applied to the arm).

It is furthermore possible to mount an extensometer SG2 on the arm 31a to detect an angular limit portion of the lever body 30 in which the latter abuts on a stop 32f. The measurement signal can be transmitted to a closed circuit control system of known type (not illustrated) which receives in input a reference signal indicative of an objective load value and generates in output a control signal for the actuator 34 so that the load applied by the tooth 30b converges with the reference load. Alternatively it is possible to obtain an indirect measurement of the load.

For example, if the actuator 34 consists of a screw jack driven by an electric motor 42, measurement of the load can be obtained indirectly by measuring the current Ia absorbed by the electric motor 42 tracing the load back by means of interpolations of known type. When the lever body 30a rotates freely without contact with adjacent parts, the supply current Ia of the motor 42 takes a constant value Ir which increases considerably when the tooth 30b abuts on the catch assembly 38 due to the closing stress exerted by the actuator 34. When a first current limit value If1 is reached—corresponding to a force value applied by the tooth 30b on the catch assembly 38—the electric motor 42 is blocked. This ensures that the reference load is reached and prevents excessive force being applied between the sectors 12 arranged in contact with each another, thus preventing damage to the parts arranged in contact.

When the lever body 30—at the end of its anticlockwise rotation—abuts on the stop 32f borne by the block 32 a second current limit value If2 is detected—corresponding to an angular stop—and the electric motor 42 is blocked.

According to the present invention the catch assembly 38 performs a centring function and for said purpose furthermore comprises a first catch body R1 (FIGS. 5 and 6) which extends from the appendix 26 and which is therefore integral with the stiffening structure 21-A and the sector 12-A and a second catch body R2 which extends from the body 40 and is therefore integral with the stiffening structure 21-B and the sector 12-B.

The coupling between the first catch body R1, R2 and second catch body ensures a pre-set spatial positioning of the sector 12-A with respect to the other sector 12-B adjacent thereto, preventing any translation along directions x-y of a plane PZ (FIG. 4) perpendicular to an axis RD which extends radially from the symmetry axis 7 to the lamination surface 5.

In particular, the first catch body R1 comprises a cup-shaped body 50 integral with the appendix 26, coaxial with the axis RD and open towards the catch body R2. The first catch body R1 furthermore comprises three metal elements 52 which are housed inside the cup-shaped body 50 and are delimited—among other things—by flat walls 53 facing towards the axis RD and inclined with respect to said axis.

The second catch body R2 comprises a rectilinear metal appendix 56 which is borne by the parellepipedal body 40 and extends in a radial direction RD terminating in a free portion 56c which protrudes from the body 40, faces towards the opening of the cup-shaped body 50 and is shaped in the form of a spherical calotte.

When the catch bodies R1 and R2 are coupled together, the free portion 56 penetrates the cup-shaped body 50 with the spherical calotte 56 abutting in a single point P1, P2, P3 with a respective inclined flat wall 53 (FIG. 6). The plane PZ passes through the three points P1, P2, P3. The contact of the spherical calotte 56 with the three inclined planes 53 therefore ensures correct spatial positioning of the parts along the plane PZ preventing any translation along the axes x y.

In particular, the position of the three metal elements 52 inside the cup-shaped body can be adjusted by means of screws 59 (FIG. 6) which extend through threaded holes 60 provided in a base wall of the cup-shaped body 50. Each screw 59 has a first end arranged in a seat provided inside a respective metal element 52 and a second end which protrudes from the cup-shaped body and is provided with a hexagonal seat. By axially adjusting the position of the screws 59 it is possible to modify the position of the inclined walls 53 inside the cup-shaped body 50 and therefore the spatial position of the three points P1, P2, P3.

Said operations are performed in a closing step of the sectors in order to memorise an optimal position of the sectors with respect to each other. Said optimal position is subsequently maintained, during the opening-closing operations of the sectors.

The invention claimed is:

1. A constraint system configured to operate with sectors of a device (2) for producing an airplane fuselage in which a lamination mandrel (4) is defined by an external surface (5) which defines a rotation solid with respect to a symmetry axis (7); said lamination mandrel (4) is adapted to receive and support a band of impregnated synthetic material which is deposited and wound on the external surface (5) forming a plurality of overlapping layers which are subjected to a polymerisation process under vacuum for forming a structural section of the airplane;

the lamination mandrel (4) comprises a plurality of sectors (12) angularly spaced about the axis (7) and mobile between:

an expanded lamination position in which the sectors (12) have greater rectilinear edges (13) parallel to the axis (7) and arranged side by side and the external surfaces of the sectors (12) opposite to the axis (7) define together said external surface (5); and a contracted disassembling position in which at least part of said sectors (12) approaches the axis (7) moving away from the trace of the surface (5) to reduce the radial dimensions of the mandrel and allow the extraction of the mandrel itself (4) from the structural section of the airplane;

the side by side edges (13) of different sectors are adapted to be arranged one on the other in a peripheral overlapping region (13s), characterised in that the constraint system is configured to be arranged between each sector and the sectors adjacent thereto; said constraint system comprising a first catch body (R1) borne by a first sector (12-A) and a second catch body (R2) borne by a second sector (12-B) adjacent to the first (12-A);

the first and the second catch body being configured so that, when coupled to one another, a predetermined arrangement of the first sector (12-A) with respect to the second sector (12-B) adjacent thereto is obtained thus preventing any translation along two directions (x-y) which lie in an adjustment plane (PZ, FIG. 4) perpendicular to an axis RD which extends radially from said symmetry axis (7) to the external surface (5); said first catch body (R1) comprises a cup-shaped body (50) coaxial to the axis RD and open towards the second catch body (R2); the first catch body (R1) further comprises three metal elements (52) which are housed within the cup-shaped body (50) and are defined by fiat walls (53) facing towards the axis RD and inclined with respect to this axis;

said second catch body (R2) comprises an appendix provided with an end profiled as a spherical calotte adapted to abut in a single point P1, P2, P3 with a respective inclined flat wail (53); said three points P1, P2, P3 lie in said adjustment plane.

2. The system according to claim 1, characterised by comprising means for adjusting the position of the three metal elements (52) which are housed within the cup-shaped body (50).

3. The system according to claim 1, wherein at least one clamping device (25) is provided, which is actuatable in the expanded lamination position of the mandrel and is adapted to maintain in contact the side by side edges (13) of adjacent sectors (12) applying a closing force between the edges in the overlapping region (18s).

4. The system according to claim 3, wherein said clamping device (25) comprises:

a lever body (30) which has a central portion (30c) hinged to an appendix (32) which extends from a first sector (12_A) inwardly of the lamination mandrel (4) to rotate about a hinge axis (33) parallel to said symmetry axis (7);

an actuator (34) provided with an outlet member (35) having an end portion (36) hinged to a first end portion (30a) of said lever body (30) and linearly mobile with opposite directions along a direction transversal to said hinge axis (33) to obtain the rotation of said lever body (30) about said hinge axis (33) according to opposite rotation directions;

a catch assembly (38) borne by a second sector (12_B) adjacent to the first sector (12_A);

said lever body (30) having a second tooth-shaped end portion (30b) arranged on the opposite side with respect to the first end portion (30a) with respect to said hinge axis (33); the rotation of the lever body (30) according to a first rotation direction takes the toothed portion (30b) from a resting position, in which it is separate from the catch assembly (38) to an actuation position, in which it is coupled to the catch assembly (38) to exert a force directed inwardly of the mandrel (4) and ensure the compression between said overlapped edges.

* * * * *